(12) United States Patent
Roitblat et al.

(10) Patent No.: US 8,401,841 B2
(45) Date of Patent: Mar. 19, 2013

(54) RETRIEVAL OF DOCUMENTS USING LANGUAGE MODELS

(75) Inventors: Herbert L. Roitblat, Ventura, CA (US); Brian Golbère, Ojai, CA (US)

(73) Assignee: OrcaTec LLC, Ojai, CA (US)

( * ) Notice: Subject to any disclaimer, the term of this patent is extended or adjusted under 35 U.S.C. 154(b) by 1245 days.

(21) Appl. No.: 11/847,915

(22) Filed: Aug. 30, 2007

(65) Prior Publication Data

US 2008/0059187 A1   Mar. 6, 2008

Related U.S. Application Data

(60) Provisional application No. 60/824,251, filed on Aug. 31, 2006.

(51) Int. Cl.
*G06F 17/27* (2006.01)
(52) U.S. Cl. .......... 704/9; 704/10; 704/256.3; 345/168; 707/723; 707/749; 715/255
(58) Field of Classification Search ............... 704/9, 10, 704/256.3; 706/12; 345/168; 707/723, 749; 715/255
See application file for complete search history.

(56) References Cited

U.S. PATENT DOCUMENTS

| | | | | |
|---|---|---|---|---|
| 4,839,853 | A | | 6/1989 | Deerwester et al. |
| 5,721,902 | A | * | 2/1998 | Schultz ................................ 1/1 |
| 5,930,746 | A | * | 7/1999 | Ting .................................. 704/9 |
| 5,943,669 | A | * | 8/1999 | Numata ............................... 1/1 |
| 6,052,657 | A | * | 4/2000 | Yamron et al. .................... 704/9 |
| 6,189,002 | B1 | | 2/2001 | Roitblat |
| 6,269,368 | B1 | * | 7/2001 | Diamond .............................. 1/1 |
| 6,292,772 | B1 | * | 9/2001 | Kantrowitz ....................... 704/9 |
| 6,510,406 | B1 | * | 1/2003 | Marchisio ......................... 704/9 |
| 6,856,988 | B1 | * | 2/2005 | Humphrey et al. ........... 707/749 |
| 7,031,908 | B1 | * | 4/2006 | Huang et al. ..................... 704/9 |
| 7,089,188 | B2 | | 8/2006 | Logan et al. |
| 7,111,000 | B2 | * | 9/2006 | Wen et al. ..................... 707/749 |
| 7,162,468 | B2 | | 1/2007 | Schwartz et al. |
| 7,382,358 | B2 | * | 6/2008 | Kushler et al. ................. 345/168 |
| 7,395,205 | B2 | * | 7/2008 | Franz et al. ................. 704/256.3 |
| 7,693,825 | B2 | * | 4/2010 | Wang et al. .................... 707/723 |
| 2002/0052730 | A1 | * | 5/2002 | Nakao ............................ 704/10 |
| 2003/0101172 | A1 | * | 5/2003 | De La Huerga .................. 707/3 |
| 2005/0138548 | A1 | * | 6/2005 | Liu et al. ........................ 715/513 |
| 2005/0228783 | A1 | * | 10/2005 | Shanahan et al. ................. 707/3 |
| 2007/0214131 | A1 | * | 9/2007 | Cucerzan et al. ................. 707/5 |

OTHER PUBLICATIONS

Jing, Y. and Croft, W. B., An Association Thesaurus For Information Retrieval, In Proceedings of the Intelligent Multimedia Information Retrieval Systems, (RIAO 1994, New York, NY),146-160.

Matsuo, Y. and Ishizuka, M., Keyword Extraction From A Single Document Using Word Co-Occurrence Statistical Information, International Journal on Artificial Intelligence Tools, vol. 13, No. 1, 2004, 157-169.

(Continued)

*Primary Examiner* — Michael Colucci
(74) *Attorney, Agent, or Firm* — Dardi & Herbert, PLLC; Peter S. Dardi; Nikhil Patel

(57) ABSTRACT

Methods of retrieving documents using a language model are disclosed. A method may include preparing a language model of a plurality of documents, receiving a query, processing the query using the language model, and using the processed query to retrieve documents responding to the query via the search engine. The methods may be implemented in software and/or hardware on computing devices, including personal computers, telephones, servers, and others.

26 Claims, 8 Drawing Sheets

OTHER PUBLICATIONS

Song, F. and Croft, W. B., A General Language Model For Information Retrieval, In Proceedings of the Eighth international Conference on Information and Knowledge Management, Nov. 2-6, 1999, Kansas City, MO.

Srikanth, M. and Srihari, R., Biterm Language Models for Document Retrieval, In Proceedings of the 25th Annual International ACM SIGIR Conference on Research and Development in Information Retrieval, Aug. 11-15, 2002, Tampere, Finland.

Srikanth, M. and Srihari, R., Incorporating Query Term Dependencies In Language Models For Document Retrieval, In Proceedings of the 26th Annual International ACM SIGIR Conference on Research and Development in Information Retrieval, Jul. 28-Aug. 1, 2003, Toronto, Canada, SIGIR '03. ACM Press, New York, NY, 405-406.

* cited by examiner

RETRIEVAL OF DOCUMENTS USING LANGUAGE MODELS

RELATED APPLICATION INFORMATION

This patent claims priority to Provisional Patent Application No. 60/824,251 filed Aug. 31, 2006, the contents of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to computer readable document and file content analysis and retrieval of computer readable documents and files as well as information contained therein.

2. Description of the Related Art

There are several approaches to information retrieval. In general the goal is to find documents that best address the user's information need as expressed in a query. A Boolean approach, matches documents if they satisfy the truth conditions of a Boolean statement (e.g., budget and proposal not loss).

A vector-space model represents documents and queries as vectors, in which each position may stand for a specific word. An element in the vector is set to be nonzero if the corresponding word is in the text. The same element is set to 0 if the word is not in the text. In this approach, the relevance of a document to a query is usually measured as the cosine of the angle between the two vectors, but other measures, such as Euclidean distance, are also possible. Neural network approaches may also employ a form of the vector space model.

There has been a great deal of activity over the last several years in conceptual search. Conceptual search attempts to find documents that are conceptually related to a search query, rather than just those that contain the query terms.

One approach to conceptual search uses a knowledge structure, such as a thesaurus, taxonomy, or ontology. These knowledge structures are typically created by human knowledge engineers and may include descriptions of how words are related to one another. A thesaurus specifies the synonyms for each entry word. A taxonomy describes a hierarchy of classes, where each lower-level item is a subclass of a higher-level item. An ontology also describes categorical relations, but these do not have to be strictly hierarchical. When a user enters a query, the information structure provides additional terms that the designers have determined are conceptually related to the query terms.

Other approaches may use machine learning or statistical inference to determine how concepts are related to query terms, and thus how documents containing those concepts are related to queries. Two of these technologies are based on the vector space model.

TABLE 1

Mathematical approaches to concept learning

| | Vector space | Probabilistic |
|---|---|---|
| Word-document | Latent Semantic Indexing | Naïve Bayesian Classifiers |
| Word-word | Neural network | Present language model system |

A well known mathematical approach to concept-related retrieval is latent semantic indexing (LSI), also called latent semantic analysis. Latent semantic indexing starts with a matrix of word—document associations. It employs the statistical procedure of singular vector decomposition to reduce the dimensionality of these associations and capture the regularities that give the system its conceptual ability. Words that are used in similar documents are represented along similar dimensions related to their meaning.

A second vector-related approach to conceptual search involves the use of a neural network. This approach starts with a matrix of word-word associations. It uses a neural network process related to the statistical procedure of principal component analysis to reduce the dimensionality of the word-word associations and to capture the regularities that give the system its conceptual ability. Words that are used in the same context as other words are represented along similar dimensions related to their meaning.

A fourth commonly used approach to conceptual search is based on the statistics of probability to derive conceptual meaning. Probabilistic approaches to conceptual search use the statistics of probability to estimate the likelihood that a document is relevant to a specific query. Generally, these models are focused on computing the probability that a document was relevant to a specific category of documents. These estimates are derived from a collection of documents that are known to be relevant to each of the categories involved.

A widely used probabilistic approach is a Bayesian classifier. These classifiers use Bayesian probability theory and a set of categorized examples to determine the likelihood that each word in a document is indicative of one category or another. It then uses this category information to provide conceptual information to the user about his or her query. This Bayesian approach limits its conceptual "knowledge" to just those categories that were used in calculating the probabilities.

Another approach to conceptual search also exploits the statistics of probability. This approach involves the use of language models to capture the conceptual relationships. A specific version of this language-modeling approach, which introduces a number of innovations, is described herein.

Figure 1:
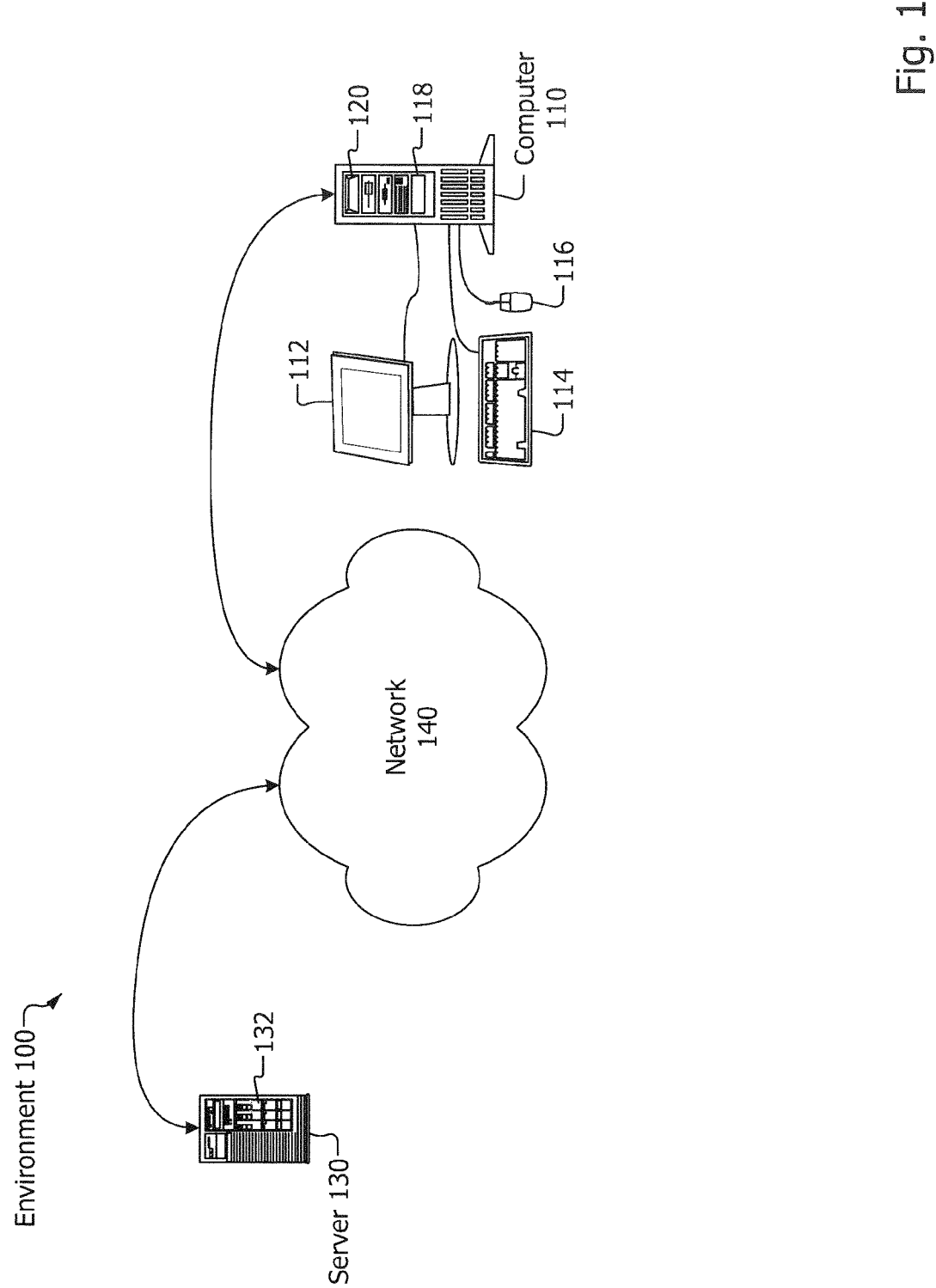
FIG. 1 is a block drawing of an environment in which a method of retrieval of documents using language models may be implemented.

Throughout this description, elements appearing in figures are assigned three-digit reference designators, where the most significant digit is the figure number and the two least significant digits are specific to the element.

DETAILED DESCRIPTION

A language modeling method for retrieval of documents and files and for retrieval of information contained therein is described. Users of computers and computing devices regularly search for documents and files. The documents sought are documents and files created by the user as well as documents and files on the Internet or other network. The language modeling method described herein provides a way to access documents and files desired by a user.

The language modeling method is an extension of a probabilistic model. The language modeling method uses probability statistics to recognize which queries are relevant to which documents, and models the probability of generating the query from a model of the documents, rather than trying to model relevance.

Language modeling is the process of computing the probability distribution of a sequence of words and using those probabilities to make predictions about these distributions in text. The language modeling method captures the statistical regularities of language generation. The language modeling method implicitly recognizes that any specific utterance is a sample drawn from a collection of possible utterances. In the language modeling method, documents are ranked by the estimated probability that a query would be produced as a random text sample generated by the document model.

Language modeling has been used in speech recognition systems. Rather than assuming that each word is independent of every other word that might be uttered, language models exploit the conditional probability of words, given previously observed words, to constrain the range of likely word utterances, thereby greatly improving the accuracy of the recognition process.

In the language modeling method of information retrieval, each document is viewed as a language sample that was generated by a specific model. A language model is used rather than the distribution itself because actual distributions are sparse and noisy. In contrast, the language model is free of noise and is regular.

Individual documents contain only a limited and fixed set of words, but there are often many other words that could have appeared in the same place. For example, the word "child" could be replaced by "youth," "young person," "boy," or "kid." People write sentences like "The boy skate-boarded down the street." People do not write sentences like "The [boy, child, youth, young person, kid] skateboarded down the street." The language modeling method recognizes that any of the words in brackets could have been used, but in any particular sentence only one of the words is used. The language modeling method explicitly captures the regularity of words in text while recognizing that each text is a sample from a distribution of possible word sequences.

Perhaps as a result of its origins in speech recognition, most other approaches to language modeling in information retrieval are based on the serial position of words. Bigram models, for example, are based on the combinations of successive words found in the text (for example, the preceding sentence includes these bigrams: bigram-models, models-for, for-example . . . ). The statistics concern the probably of the second word in each pair, given the first word in the pair. Trigram models compute the probability of the third word in each triplet from knowledge of the first two. Unigram models treat each word as an independent event. Although human languages cannot be fully explained by such n-gram finite-state grammars, they provide a useful approximation for purposes of speech recognition and information retrieval. In information retrieval, bigram models tend to perform better than unigram models.

In speech recognition there is no real alternative but to predict succeeding words based on previous words because speech is recorded one word at a time in sequence, and the preceding words are the only words that can be known. Speech recognition cannot usually wait until the end of an utterance to begin deciphering it. When evaluating written text, however, it is possible to analyze various word combinations because the entire text is immediately and readily available.

In the language modeling method, the restriction of dealing only with pairs of successive words is relaxed, and co-occurrence statistics—how often two words occur in the same paragraph, independent of order—are used. Using paragraph word pair occurrence with language models is an improvement and enhancement over traditional language modeling methods. As used herein, word pairs are referred to as "digrams". A related construct is called a "biterm". Biterm models may outperform bigram models. This same method can be extended to larger combinations of words, namely trigrams, n-grams; triterms, n-terms.

Words are often more strongly related to distant words than to those that are closer together. For example consider these two sentences:

John is very happy to see Meredith.

John, who is sitting in the conference room, is very happy to see Meredith.

In these two sentences, the relationship between John and Meredith is the same despite the fact that they are separated by differing numbers of intervening words. Similarly, the relationship between Vice President and Dick Cheney is the same in both of the following two sentences:

Vice President Dick Cheney argued for his energy policy.

Vice President and former Congressman Dick Cheney argued for his energy policy.

The language modeling method includes the computation of the probability of each word in a paragraph given each other word in the paragraph.

In general, the language modeling method of information retrieval finds the document for which the probability p of a query given the document is maximized. Then, for each document d, the probability of the query Q having terms t given that document d is computed more specifically given the model M of that document. The core of this probability function p typically takes the general form $$\hat{p}(Q|M_d) = \prod_{t \in Q} \hat{p}(t|M_d)$$

usually with the addition of other terms. If any query terms t are not in the document's language model, the predicted probability of the query, given the language model drops to 0.

Much of the research on the use of language models for information retrieval focuses on smoothing the language model for each document to replace any terms with p=0 with some small nonzero term. Usually these involve some mixture of the distribution of word usage in that document and the distribution of words in the collection as a whole.

Environment

FIG. 1 is a block drawing of an environment 100 in which a method of retrieval of documents using language models may be implemented. The language modeling approach described herein may be implemented in software and executed on a computing device such as server 130 and/or computer 110.

A computing device as used herein refers to a device with a processor, memory, and a storage device. Computing devices are capable of executing instructions. The term computing device includes, but is not limited to, personal computers 110, server computers, computing tablets, set top boxes, video game systems, personal video recorders, voice over Internet protocol (VOIP) telephones, analog telephones, digital telephones, mobile telephones, cellular telephones, personal digital assistants (PDAs), portable media players, portable audio players (including MP3 players), portable computers, notebook computers, and laptop computers. Computing devices may run an operating system, including, for example, variations of the Linux, Unix, MS-DOS, Microsoft Windows, Palm OS, Symbian, and Apple Mac OS X operating systems.

A computing device may include or be coupled with a display, such as display 112 shown coupled with personal computer 110. The computing device may be coupled with or include one or more user input devices, including, for example, keyboard 114, mouse 116, a track ball, a scroll wheel, a touch pad, a key pad, a touch screen, navigation buttons, a joystick, a pen and tablet, a stylus and touch screen, and/or others. A user may use a user input device to click on, select, or otherwise activate or control a user interface item such as a button, link, slider, etc. and to provide input to the operating system or programs running on the personal computer via a graphical user interface, text interface or other user interface provided on the computing device. The personal computer 110 and other computing devices may include a network interface. The personal computer 110 and other computing devices may include other components which are not discussed herein.

The network interface in a computing device may be a card, chip, or chip set that allows for communication over a network 140. The network may be and/or include one or more of each of a local area network (LAN), a wide area network (WAN), a wireless wide-area networks (WWAN), a global system for mobile communications (GSM) network, an enhanced data for GSM evolution (EDGE) network, a public switched telephone network (PSTN), and others. The network 140 may be or include the Internet. The network 140 may support various versions of the Ethernet protocol, the Internet protocol, and other data communications and/or voice communications protocols. The network 140 may be or include one or more of each of a packet switched network and/or a circuit switched network.

Computing devices may include communications software that allows for communication over one or more networks. Depending on the computing device and the network, the communications software may provide support for communications using one or more of the following communications protocols or standards: the User Datagram Protocol (UDP), the Transmission Control Protocol (TCP), the Internet Protocol (IP), and the Hypertext Transport Protocol (HTTP); one or more lower level communications standards or protocols such as, for example, the Gigabit Ethernet standards, the Fibre Channel standards, one or more varieties of the IEEE 802 Ethernet standards, and other protocols.

The techniques described herein may be implemented in software stored on storage media accessible either directly or via a storage device included with or otherwise coupled or attached to a computing device. Similarly, files and documents are also stored on storage media accessible either directly or via a storage device included with or otherwise coupled or attached to a computing device. As such, storage media are readable by a computing device or machine. Storage media may be referred to as machine readable media. Storage media include, for example, magnetic media such as hard disks, floppy disks and tape; optical media such as compact disks (CD-ROM and CD-RW) and digital versatile disks (DVD and DVD±RW); flash memory cards; and other storage media. A storage device is a device that allows for reading and/or writing to a storage medium. Storage devices include, hard disk drives, DVD drives, flash memory devices (such as readers and writers), and others. As shown, personal computer 110 includes a hard disk drive 118 and a DVD-RW drive 120 and server 130 includes hard disks 132.

The methods of retrieval of documents and files and information from the documents and files using language models may be used with various kinds of documents and files. The terms documents and files are used interchangeably herein. The terms documents and files include documents and files that contain human readable text such as that produced by word processing programs, including document files such as .DOC files produced by Microsoft Word and open document text .ODT files produced by Open Office Writer, as well as .TXT text files and .PDF portable document format (PDF) files. The terms documents and files also include media files such as audio files, video files and still images in various formats, including, for example, Joint Photographic Experts Group (JPEG), Graphics Interchange Format (GIF), Portable Network Graphics (PNG), Tagged Image File Format (TIFF), Moving Pictures Expert Group-4 (MPEG-4), MPEG-7, and others, and particularly those media files that include metadata, namely information about the media included in the file. The terms documents and files include formatting and markup files such as those in the Hyper-Text Markup Language (HTML), Standard Generalized Markup Language (SGML), Synchronized Media Integration Language (SMIL), Extensible Markup Language (XML), User Interface Markup Language (UIML), their variants, and others.

The documents and files may be stored on a storage device or storage medium included in or coupled with a computing device, such as hard disk drive 118 of personal computer 110 and hard disk drive 132 of server 132. A user or third party may create and/or store documents and files on the storage media for access and retrieval by one or more users.

The software that implements the methods described herein may be in the form of, for example, an application program, one or more modules, instructions, code, modules, and scripts, applets (e.g., a Java applet), subroutines, an operating system component or service, firmware, and/or a combination thereof. The software may be implemented in one or more programming languages such as, for example, high level programming languages including C, C++, Java, Visual Basic, and others; or low level assembly and machine language. Software may be machine readable.

The software may be stored as or on and the method may be implemented in whole or in part from one or more Field Programmable Gate Arrays (FPGAs), Application Specific Integrated Circuits (ASICs), programmable logic devices (PLDs), programmable logic arrays (PLAs), and other chip-based hardware and firmware.

The methods described herein may be implemented on a single computing device such as personal computer 110 or server computer 130, or may be implemented on a group of computing devices arranged in a network, cluster, or other organization. The methods described herein may be implemented using client-server functionality.

Figure 2:
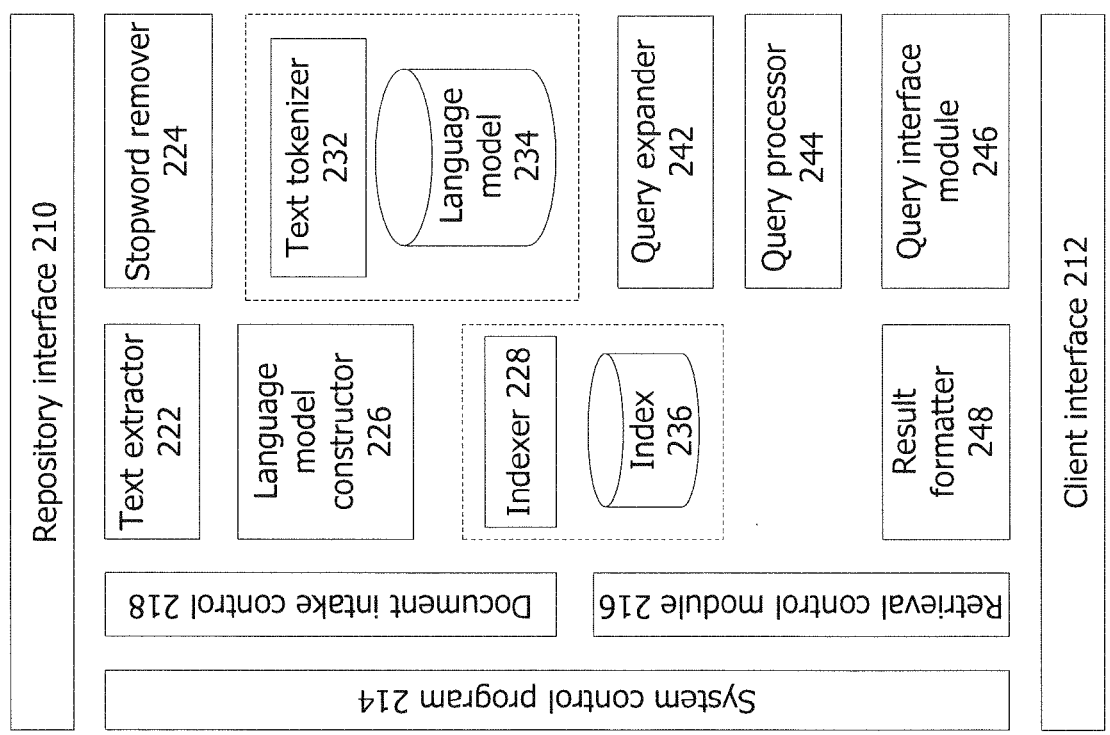
FIG. 2 is a block drawing of constituent software modules that may be used to implement a method of retrieval of documents using language models.

FIG. 2 is a block drawing of constituent software modules that may be used to implement a method of retrieval of documents using language models. A system control program 214 manages the method described herein and directly communicates with the repository interface 210, the client interface 212, the retrieval control module 216 and the document intake control 218. The text extractor 222 performs text extraction as described herein. The stopword remover 224 removes stopwords from documents as described herein. The text tokenizer 232 tokenizes the text in documents as described herein. The text tokenizer 232 passes tokenized text to the language model constructor 226 and indexer 228. The text tokenizer 232 may store the tokenized text temporarily or permanently in memory or other storage medium. The language model constructor 226 constructs language models based on the tokenized text of a document as described herein and stores the language model in language model database 234. The indexer 228 performs indexing of documents as described herein based on the tokenized text of a document and stores indexes in index database 236. The query interface module 246 may receive queries via client interface 212. The queries may be processed by query processor 244. The queries may be expanded by query expander 242.

The arrangement of modules depicted in FIG. 2 is an example. The modules depicted in FIG. 2 may each be separate scripts or programs, may each be combined as a single application, and may be combined in various different groups and arrangements. For example, the index 236 may be included with or adjacent to the text tokenizer 232 and/or the language model database 234. For example, the stopword remover may be included between the text extractor 222 and the language model constructor 226.

Methods

An embodiment of the language modeling method computes the probability of certain other query terms (expanded terms) from the original query. For example, if a document has the word "lawyer" in it, then it is also likely to have the words "judge," "attorney," "case," "court," etc. Conversely, a document that had any of these words in it would be likely to be conceptually related to a document that had the word "lawyer" in it, even if the related document does not actually have the query word. This processing may be performed by the query processor 244 and the query expander 242 when processing a query.

A formula for an expanded query $Q_x$ is:

$$Q_x = Q_i + \max_{k, x \neq i} (\hat{p}(q_x | q_i, M_d))$$

The expanded query $Q_x$ consists of the initial query terms $Q_i$ and the k additional terms with the highest probability according to the language model and the original query terms. These additional terms are the terms that are most strongly associated with the original query terms. They provide the context in which the $Q_i$ terms occurred and, therefore, the highest probability terms that would signify a similar meaning to those conveyed by the original query terms. These terms are weighted by their estimated probability and normalized to a fixed sum. For example, the sum of all of the weights of the expanded query terms can be set to 1.0. The original query terms are boosted so that the sum of their weights is a multiple of the sum of the additional terms (e.g., 10×). This process helps to ensure that documents that contain the actual query terms are more likely to achieve the highest retrieval scores and appear at the top of the results list.

In this example, the original query terms collectively receive ten times the collective weight of the expanded query terms.

The queries are then submitted to the search engine, which may combine them with other search clauses (e.g., fielded or Boolean search) and return the results. The search engine used is not critical, provided that it can accept weighted queries. An embodiment of the method includes preparing the expanded queries including the associated weighting scheme to submit the query for the search.

The language modeling method solves the problem of smoothing, because the method does not explicitly compute the probability of query words that are not in the document to calculate the probability that a query could be computed from the document language model. The language modeling method models language usage patterns well enough so that queries for a document using words that "might have been" in the document, but in fact were not, may succeed. Referring to the skateboarding examples described above, for example, the language modeling method retrieves a document about a young person skate boarding without having to know whether the person was described as a youth, boy, girl or child.

The language modeling method allows queries to be based on more stable models because there are more paragraphs in a collection than there are in a document. The language modeling approach may identify what to search for. Conventional search tools can be used to perform actual queries. The language modeling method may operate in conjunction with the open source search tool Lucene and/or other search engines, and/or may be implemented in conjunction with a proprietary or publicly available search engine. Lucene is an information retrieval library available from the Apache Software Foundation.

The language modeling method uses only the most closely related terms in the query expansion. According to one embodiment of the language modeling method, 10 terms are selected and weighed, according to criteria described below. The language modeling method does not rely on phrase rules, and uses term-term relations rather than termndocument relations. The language modeling method differentially weights each individual expanded query term according to the term's strength in the language model. The language modeling method is language independent.

The language modeling method does not create a thesaurus, does not use rules to select words or phrases, and does not limit the size of paragraphs to a fixed number of sentences. Rather it uses the probability of word co-occurrence within a paragraph.

The language modeling method computes the relations based on the entire corpus of documents to be indexed or a (randomly) selected subset of that corpus. The language modeling method expands queries based on a computation of semantic similarity of the query to the entire corpus of documents as represented as a language model.

Not all word pairs are of equal value in a language model. According to the language modeling method, digrams that are most strongly characteristic of a document are given more weight in the model than digrams that are common to many documents. Similarly, according to the language modeling method, word pairs that are the result of random pairing are given less weight than digrams that are "intentionally" created (e.g., the digram "Vice President" is more likely to be characteristic of a document than is the digram "and former"). Pairs that occur more frequently are likely to be more representative of a document than pairs that occur less frequently, and this is represented in the language model.

According to the language modeling method, digrams that occur in more paragraphs in a document are weighted more heavily than digrams that occur in fewer paragraphs. This digram approach is in contrast to computing the term frequency. The term frequency is the number of times a term appears in a document. The digram frequency may be a count of the number of paragraphs in which the term occurs. According to the language modeling method, the more a digram occurs, the more likely it is to be characteristic of the meaning of the document.

The probability that a digram will occur by chance depends on the unigram frequency of each of the words in the pair (x y), where x and y are each words in a paragraph. The information value of a digram is the difference between the frequency of the digram and the frequency to be expected based on its constituent unigram words. This measure is related to $X^2$, which is a measure of the degree to which a distribution differs from the one expected by chance.

The information value v of a pair can be estimated using the equation:

$$v_{ij} = n(x_i y_j) - \frac{n(x_i)n(y_j)}{N}$$

where n(x)=number of documents containing x and N=total document count. $v_{ij}$ is also related to mutual information I(XY), which is computed as $$I(XY) = \sum_{y \in Y} \sum_{x \in X} p(x, y) \log \frac{p(x, y)}{p(x)p(y)}$$

where p(x,y) is the joint probability distribution function of X and Y and the log is in base 2 to measure mutual information in bits. Mutual information indicates the deviation of the joint distribution of X and Y from the product of their marginal distributions.

The language modeling method may search for entire distributions of terms, rather than just for individual words. In the skateboard sentence mentioned above, the language model could include the information that "skateboarded" occurs with "boy" 35% of the time and with "kid" 8%, etc. This information may be used to explicitly search for all of these relations simultaneously, thereby reducing the effects of noise, where noise is the variance in the word usage patterns.

The highest ranking k (e.g., 10) terms from the language model may be added to the query. The value of k is not critical, but the lower the rank of the added terms the less valuable they are likely to be at improving the query. These are the terms that provide the most information value to the original query. The weights of these added terms are normalized, for example to sum to 1.0. The weights of the original query are also normalized, for example, to sum to 10.0.

Document Intake and Initial Processing

Figure 3:
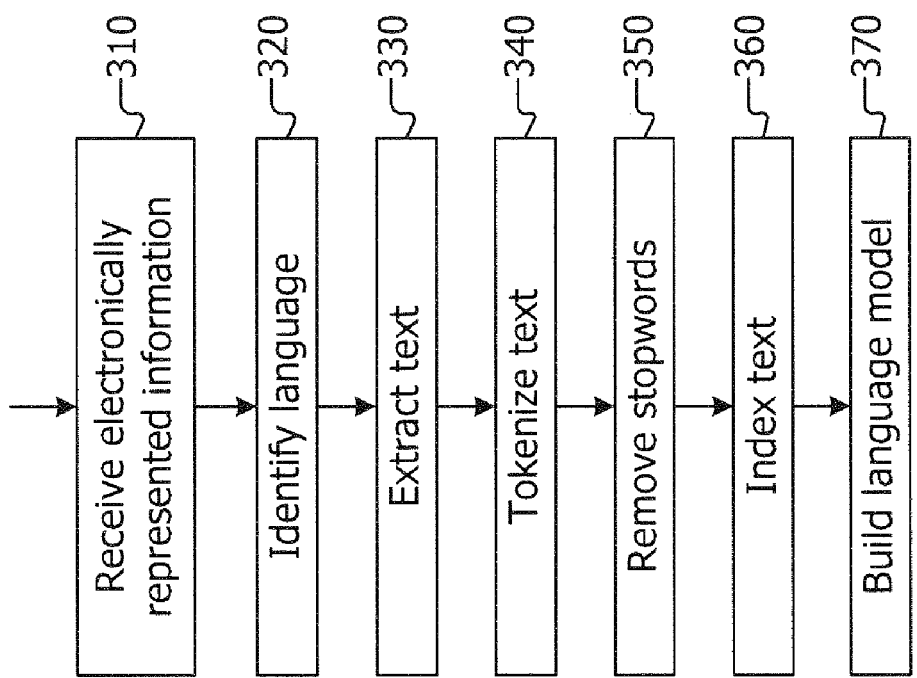
FIG. 3 is a flow chart of an overview of the actions taken during a method for language modeling.

FIG. 3 is a flow chart of an overview of the actions taken during a method for language modeling. A group or plurality of documents may be received electronically, as shown in block 310. Documents may be received through the client interface 212 shown in FIG. 2. As each document is processed, various steps are taken. The language contained in the document is identified as shown in block 320. This is a determination of whether the document contains words in Chinese, English, French, German, Japanese, Korean, Russian, Spanish, or other languages.

Text is extracted as shown in block 330, and the text is tokenized as shown in block 340. This may be achieved by text extractor 222 and text tokenizer 232 of FIG. 2. Various text extractors and tokenizers can be used for this purpose. The text may be tokenized to various degrees as long as the text in a particular collection is processed uniformly, that is, consistently.

Figure 7:
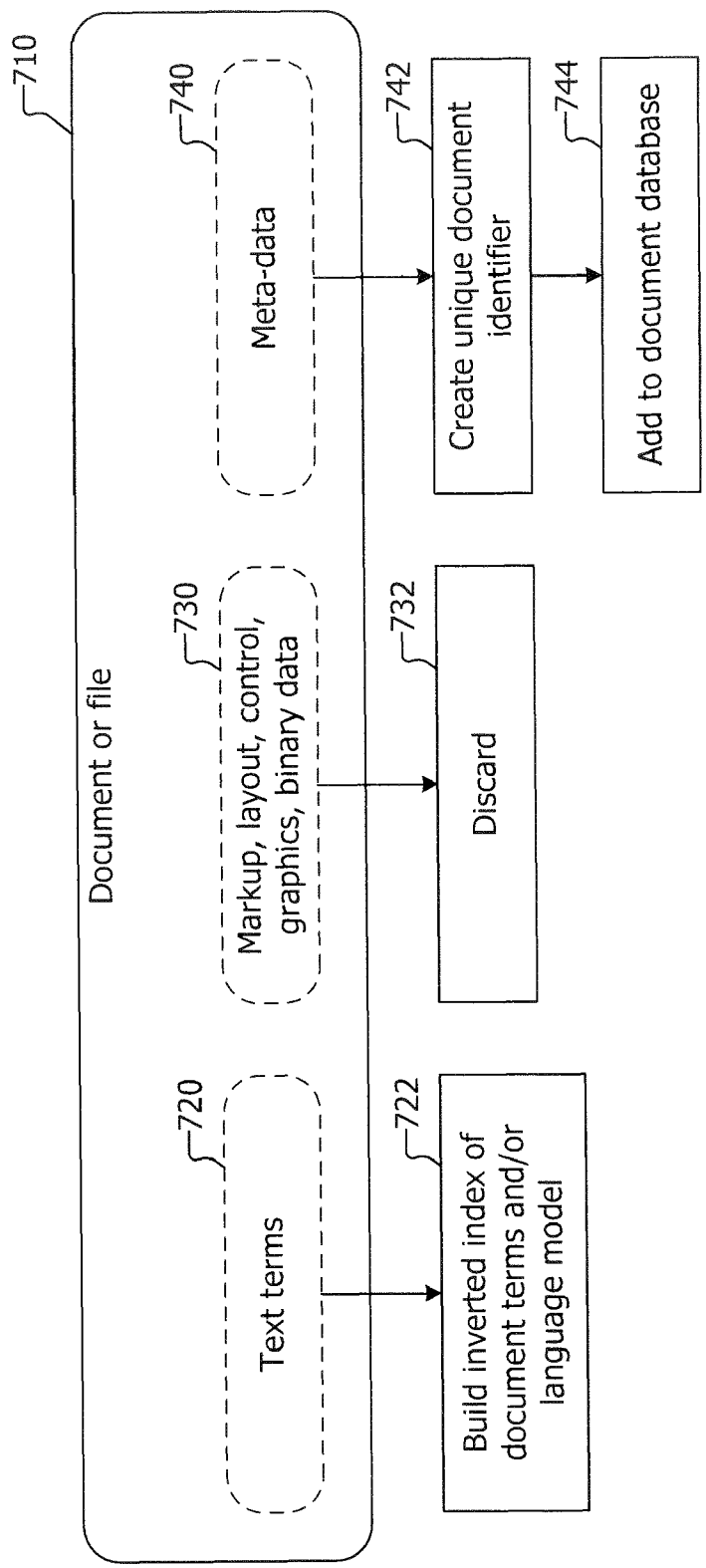
FIG. 7 is a block drawing of the constituent components of a document or file.

Text extraction takes into consideration all portions of a document or file and determines which parts of a document file are text that may be extracted and used in the language modeling method. FIG. 7 is a block diagram of the constituent components of a document or file 710. A document or file 710 may include three kinds of information or data, namely (1) text terms 720; (2) markup, layout, control, graphics, binary and other data; and (3) meta-data, namely data that describes the other data. Meta-data as used herein in this context may include the creation date, editing date(s), last saved date, author, organization, number of words, number of pages, number of paragraphs, number of footnotes, number of objects, number of images, and other information about the data contained in the document or file. Meta-data may also include external meta-data, such as, for example: file name, file path, file permissions, and others. According to the methods described herein, the first kind of data, namely text terms 720, may be used to build an inverted index of document terms and/or the language model, as shown in block 722. The second kind of data 730, namely the markup, layout, control, graphics, binary and other data, may be discarded, as shown in block 732. The third kind of data, the meta-data 740, may be used to create a unique document identifier, as shown in block 742, which may be added to the document database, as shown in block 744. The meta-data may also be entered into a searchable database. In some embodiments, the meta-data may be used to build an inverted index of document terms and/or the language model.

Returning to a discussion of block 340 of FIG. 3, tokenization is especially important in Asian ideographic languages because Asian ideographic languages are written without spaces between the words. There is often disagreement, even among native speakers, as to exactly where to place the separation between words. An important characteristic of the tokenizer is that it be consistent and be employed consistently during both document intake and during query processing.

Stopwords may optionally be removed from the text, as shown in block 350. A stopword is a word that occurs so often in the language that it conveys little useful meaning. Words such as "I," "and," and "the" are not useful index terms, and are considered stopwords. Stopwords are typically removed before indexing.

The text is indexed, as shown in block 360. This may be achieved by indexer 228 of FIG. 2. The tokenized text, minus stopwords and after indexing, is then fed to the language model acquisition system or language model constructor, which learns the relationships among the words in the document and builds a language model, as shown in block 370. The language model constructor takes each paragraph of text and computes the distribution of each word with each other word in the paragraph. The functions of the language model constructor may be achieved by language model constructor 226 in FIG. 2. The step taken in building a language model are shown in and described regarding FIG. 5, described below.

Other actions and analyses may also be performed on the documents and files. Stemming (removing inflections, prepended and appended elements, such as "un-" or "ed") may optionally be performed.

Morphological analysis of complex words into their constituents may optionally be performed. Agglutinating languages such as German or Finnish, also present challenges to document tokenization. These languages combine many morphemes (basic units of meaning) into a single word. In German, for example, Gesundheitsminister (Health Minister) is a combination (or agglutination) of "Gesundheits" and "Minister". "Gesundheits" can further be broken down into "gesund" (healthy), "heit" (noun suffix), and s (plural suffix). Breaking the word down into its smallest components would allow one to search for "gesund" and find documents about "Gesundheit," and "Gesundheitsminister." An important thing about morphological analysis in the language modeling method is that it be consistently applied across documents and between documents and queries.

The steps shown in FIG. 3 may be performed concurrently, in the sequence shown, or in another sequence.

Figure 4:
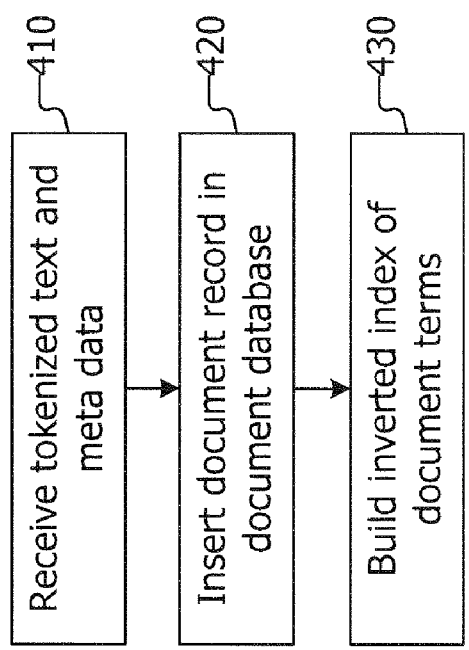
FIG. 4 is a flow chart of the actions taken during document indexing.

FIG. 4 is a flow chart of the actions taken during document indexing. The indexing described regarding block 360 of FIG. 3 and performed by indexer 228 of FIG. 2 may be performed according to the method described in FIG. 4. Tokenized text is received, as shown in block 410. A record for the document is inserted into the document index database, as shown in block 420. The document index database may be index database 236 of FIG. 2. An inverted index of document terms may be built, as shown in block 430.

Figure 8:
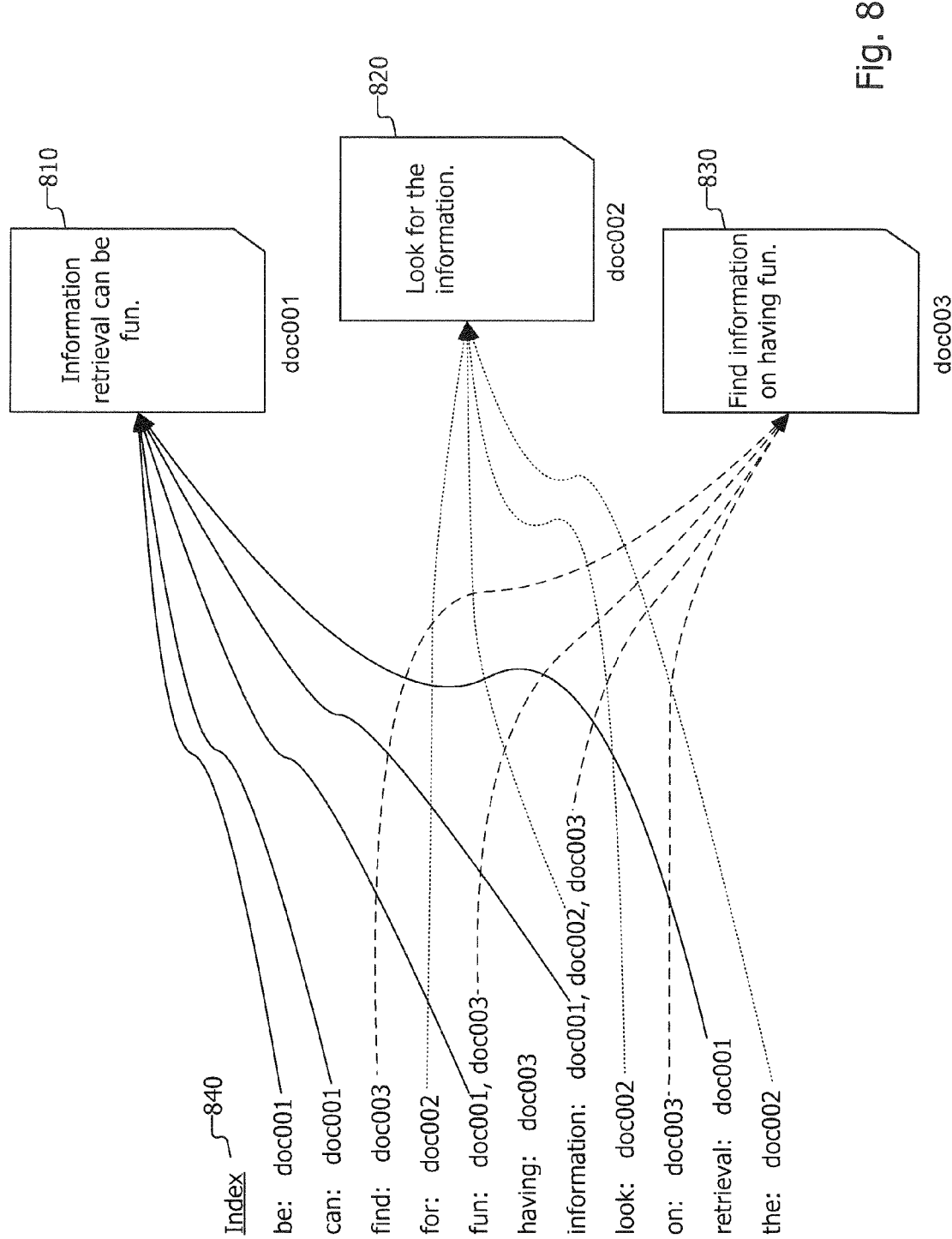
FIG. 8 is a block drawing showing an index to terms included in three documents.

FIG. 8 is a block drawing showing an index to terms included in three documents. The index may be built as described above regarding block 430 of FIG. 4. Each word in the index 840 may have a link to and/or identify the document from which it came. For example, the word "information" is included in all three documents 810, 820 and 830. As such, there are entries and links to each of the three documents associated with the term "information."

Building a Language Model

When using language modeling for information retrieval, the probability of a query given each document in the collection may be computed, and the document or documents for which the query that has the maximum probability is/are selected. A query q consists of one or more terms, where terms are words in a particular language, which may include dictionary terms as well as slang and specialized terms from a particular industry or specialty. In a standard language model, the likelihood of a query given a document is $p(q|d)=\Pi(q_i|d)$, product of the probabilities of each term given the document. Using Bayes rule, the posterior probability of a document given a query is $p(d|q) \approx p(q|d)p(d)$.

Because the standard language modeling approach depends on the product of the probabilities of each query word, if any of them is 0, the probability of the query given the document would have to be zero. That is, if the query word is not in the document, then the probability of success of the query reduces to 0. To avoid this situation, when using standard language modeling, a smoothing parameter may be used. A smoothing parameter assigns a nonzero probability to words that do not appear in the document. Smoothing parameters are typically rather arbitrary and when using standard language modeling they contribute little to identifying documents that are about the topic of the query.

The language modeling method described herein takes a different approach to exploiting language modeling. First, the present approach does not focus initially on the probability of each query term given each document, but on the probability of each word in the vocabulary given each other word in the query. These probabilities are estimated based on the co-occurrence patterns observed in a collection of documents. A document about insurance, for example, is much more likely to have the word "policy" in it than to have the word "reptile." Conversely, a document that has the word "policy" in it is much more likely to be about insurance than is one that has the word "mammal" in it, even if the word "insurance" does not happen to be in it.

The language modeling method described herein recognizes that any given query is merely a sample of all of the possible queries a user might develop to seek the same documents. Similarly, the words in a document are merely a sample of the words that could have been used to write it. For example, an author might write any of the following sentences to communicate essentially the same meaning:

He rewrote the contract to include the new terms.
He rewrote the MOU to include the new terms
He rewrote the agreement to include the new terms.

The language modeling method described herein treats both the content of documents and the content of queries as samples from a distribution of words that could have been used to express the same or similar ideas. A given query and a given document typically use only one of the alternatives from the distribution of words, but it is difficult to predict which one. As a result, the language modeling method described herein searches for a distribution of words, rather than just the specific words in the query.

The language modeling method described herein uses a language model to expand the query that a user submits using words that are probabilistically related to the query terms. These probabilities may be derived from any collection of documents. These probabilities may be derived from the same collection of documents that are indexed. For example, a search for the single word "refinancing" might be expanded using the language modeling method into a query for the following 11 words.

---

{ [refinancing, 10.000], [company, 0.020], [credit 0.041, high 0.065], [investment, 0.070], [companies, 0.075], [money, 0.098], [debt, 0.135], [loan, 0.148], [charges, 0.163], [rating 0.186] }

---

The number after each word indicates the relative weights of the terms. Words with higher weights are generally more specifically associated with the original query term. The magnitude of the weight determines how important the term is in the query, and, as a result, the ranking of the search results. In this example, the sum of the weights assigned to the original query terms is set to be 10.0 and the sum of the weights assigned to the expansion terms is set to be 1.0. This scheme serves to emphasize the original query terms, but still provides opportunity for the expanded query terms to play a role in ordering relevant documents. Other weighting schemes and scales may be used.

The words produced by application of the language model may be different from the kind of terms that a thesaurus might yield. The words need not be synonyms of the original query term, but are terms that have been found using the language model method to be associated with it or predictive of it in the context of the documents that were indexed. These words form the context in which the query term has been found in the indexed documents. The presence of one or more of these words indicates that the document is more or less about the same topic as one containing the query term, even if the query term does not appear in that particular document. The weighting scheme described earlier is the system's estimate of how predictive these terms are of the topic described by the original query words.

Figure 5:
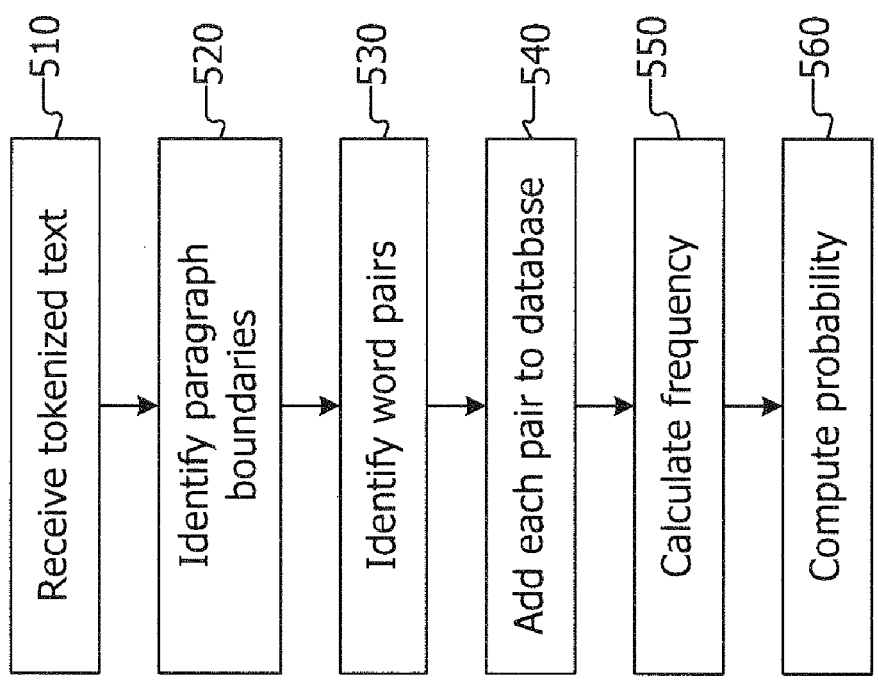
FIG. 5 is a flow chart of the actions taken during building of a language model of a document.

FIG. 5 is a flow chart of the actions taken during building of a language model of a document. The method may be repeated for a group of documents. The language model is learned directly from the documents that are processed. The same documents can be processed for indexing and for constructing the language model, or the language model can be constructed from a different set of documents or from a random subset of the indexed documents. The method learns the nuances of word-use patterns present in specific documents rather than relying on users or managers to specify documents that are indicative of what they think the words should be about. The method incorporates these nuances in the language model. It is possible to add documents to a training set without indexing them. These additional documents may be included to provide information that might be missing from the to-be-searched documents.

Referring now to FIG. 5, tokenized text is received, as shown in block 510. The tokenized text may have been created according to the method described regarding FIG. 3. Each document is broken into paragraphs and the unique words in that paragraph are identified. Paragraph boundaries are identified, as shown in block 520. All possible word pairs, regardless of the order of the words are then counted and stored in the language model. Word pairs are identified, as shown in block 530. Each word pair is added to the language model database or other data representation or data structure of the language model, as shown in block 540. The frequency of word pairs is calculated and may be added to the language model database or other data representation or data structure of the language model, as shown in block 550. That is, each word pair in a paragraph is counted once, even if one or both of the words occur multiple times in that paragraph. Over a group of paragraphs in a document, the same pair may occur multiple times and will be counted multiple times. These counts are accumulated and stored in a persistent repository, such as a database. The frequencies are stored rather than actual probabilities because the probabilities can change as documents are added to the system. Storing frequencies allows the probabilities to be computed as needed with minimal cost. Storing frequencies allows the models to be updated continuously as documents are added.

The language model can be represented as a matrix, where each row is identified by the first word in the pair and each column is represented by the second word in the pair. The value in the corresponding cell of the matrix may be the frequency with which this pair was observed over all the documents. This matrix is usually quite sparse, meaning that most of the entries are 0. Words tend to co-occur with certain words and not with others.

The word pairs may also be represented as a graph or network in which the nodes are words and the edges linking these nodes are weighted by the frequency of co-occurrence. Another way to represent the word pairs is using a simple database, or associative array, in which the key is the first word of the pair, and the values are the second words and the co-occurrence frequency.

The co-occurrence frequency is stored in the language model database or data structure (matrix, graph, or database) rather than probabilities, because the frequencies may be updated as more documents are added to the index.

The specific probabilities may be computed at the time a query is submitted, as shown in block 560. When a query is submitted to the language model, the words in the query are looked up, and the terms that have been found to co-occur are selected. At this point, as shown in block 560, the frequencies are transformed into probabilities p where $p(q_o|q_i)=f(q_i \cap q_o)/f(q_i)$.

Query Construction

Figure 6:
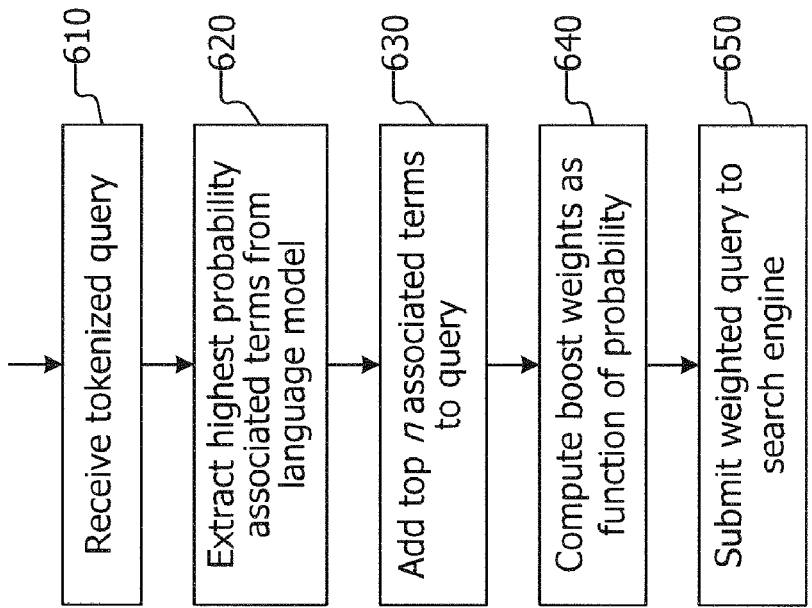
FIG. 6 is a flow chart of the actions taken during processing a query received to find a document.

FIG. 6 is a flow chart of the actions taken during processing a query received to find a document. The query may be constructed in two parts. One part is the original query as submitted by the user. The second part consists of a set of expanded terms computed using the language model. The language model captures semantic relations between the query words and the documents. Words that co-occur together tend to indicate semantic relations. Therefore, words with similar meanings will tend to have similar co-occurring terms. For example, "boy" and "youth" tend to co-occur with the same set of terms.

A tokenized query is received, as shown in block 610. The highest probability associated terms from the language model are extracted, as shown in block 620. A group of closest associated terms, the top group or the top n associated terms are added to the query, as shown in block 630. The number n may be system defined or user configurable. The probability of the original query term ($q_o$) may be computed, given each of the associated terms ($q_i$). The number of paragraphs in which the two terms co-occur $f(q_i \cap q_o)$ is divided by the number of paragraphs in which the associated term appears. The top n associated terms that maximize this probability (e.g., the top 10 terms) are then selected. The selected terms are the terms that are most predictive of the original query term.

Each of the selected terms is added to the query, as shown in block 630. The terms in the query are weighted before they are transmitted to a search module or search engine. The weighting may be referred to as a boost weight. As used herein, boost weight refers to the relative importance of the term to the query. Words with high boost weights are given more influence for determining the degree of match between the query and the documents. The boost weight is computed as a function of probability, as shown in block 640. The probabilities are transformed into weights by normalizing the vector of associated-term probabilities to sum to 1.0. The original query terms are separately normalized to sum to a different number that is a multiple of the sum of the associated terms. In the example, above, the single original query term was set to a weight of 10.0. If there was more than one original query term, they would share this sum; for example, two terms would each be assigned a weight of 5.0. Other value scales may be used. The ratio of the two sums determines the relative importance attached to the original query terms and the expanded terms.

The following is an example of the query weights assigned to related terms following a search for the word "diesel." As shown in the following list, the strongest relations are with "petroleum," "alternative," and "fuels."

{ [diesel, 10.000], [energy, 0.015], [price, 0.019], [state, 0.027], [oil, 0.055], [used, 0.057], [costs, 0.087], [local, 0.095], [petroleum, 0.131], [alternative, 0.218], [fuels, 0.296] }

The weighting scheme for the expanded terms is described above. Unlike many other information retrieval systems, the language modeling method does not use inverse document frequency (IDF), where IDF is the reciprocal of the number of documents in which the word occurs to set the weights.

The weighted query may be submitted to a search engine, as shown in block 650. The search engine may be Lucene or other information retrieval engine. The search engine may rank the resulting documents in descending order of relevance to the query.

Results

The results returned by the search module are transformed into XML, or JavaScript Object Notation (JSON) or other machine readable objects or file. These results can be displayed for a user or used by another computer program in any way that is desired.

Among the data that can be returned are snippets of matching text, namely s words before to s words after the matching text, where s may be system defined or user settable. In addition or in the alternative, matching paragraphs may be returned. The expanded query, including its weights, can also be returned as well as any meta-data that has been stored for each document.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of," and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method of modeling documents implemented by a computing device comprising:
   receiving a plurality of documents and building a language model, the building comprising, for each of the documents,
   tokenizing text included in the document;
   defining paragraphs by identifying paragraph boundaries in the tokenized text;
   identifying word pairs in each defined paragraph wherein the word pairs comprise two words occurring in any location in the same defined paragraph, including adjacent to one another;
   calculating the frequency of the identified word pairs; and
   adding the identified word pairs and corresponding frequency information to the language model.

2. The method of claim 1 further comprising:
   identifying the language(s) used in the document.

3. The method of claim 1 further comprising:
   removing stopwords from the tokenized text.

4. The method of claim 1 further comprising:
   extracting text from the document before the tokenizing the text from the document.

5. The method of claim 1 wherein building the language model further comprises:
   computing the probability of alternate terms.

6. The method of claim 1 further comprising:
   indexing the tokenized text.

7. A method of processing a query for documents implemented by a computing device comprising:
   providing a language model, the language model comprising a plurality of terms and a plurality of pair-values, each pair-value representing the relatedness of term pairs within a document;
   receiving an original query for documents after the language model is prepared independent of the original query;
   tokenizing the original query into a tokenized query;
   extracting a group of associated terms from the language model,
   wherein the extracting comprises identifying pair-values in the language model corresponding to term pairs comprising a term in the tokenized query and another term that is different from any term in the tokenized query and identifying associated terms as the terms that are different from any term in the tokenized query and that are related to at least one term in the tokenized query and
   wherein the probability of relatedness is determined from the pair-values in the language model;
   forming an expanded query comprising a top group of associated terms and the original query, wherein the top group of associated terms are a subset of the associated terms, the terms in the top group of associated terms having a higher probability of relatedness to terms in the tokenized query than associated terms not in the top group;
   computing a boost weight for each term in the expanded query based on the probability of relatedness of the terms in the expanded query being related to the terms in the original query to create a weighted query; and
   submitting the weighted query to a search engine.

8. The method of claim 7 further comprising:
   preparing the language model.

9. The method of claim 8 wherein the preparing of the language model comprises:
   receiving a plurality of documents and for each of the documents
   tokenizing text included in the document;
   identifying paragraph boundaries in the tokenized text;
   identifying word pairs in the paragraphs, wherein the word pairs comprise two words occurring in any location in a particular paragraph, including adjacent to one another;
   calculating the frequency of the word pairs in the paragraphs; and
   adding the word pairs and corresponding frequency information to the language model.

10. The method of claim 9 wherein the preparing the language model further comprises:
    identifying the language used in the document.

11. The method of claim 9 wherein the preparing the language model further comprises:
    removing stopwords from the tokenized text.

12. The method of claim 9 wherein the preparing the language model further comprises:
    extracting text from the document before the tokenizing of the text from the document.

13. The method of claim 9 wherein the preparing the language model further comprises:
computing the probability of alternate terms.

14. The method of claim 9 wherein the preparing the language model comprises:
indexing the tokenized text.

15. The method of claim 7 wherein each pair-value represents the relatedness of term pairs within one or more same paragraphs of a document.

16. A method of retrieving documents implemented by a computing device comprising:
receiving a plurality of documents;
building a language model, the building comprising, for each of the documents,
tokenizing text included in the document;
defining paragraphs by identifying paragraph boundaries in the tokenized text;
identifying word pairs in each defined paragraph wherein the word pairs comprise two words occurring in any location in the same defined paragraph, including adjacent to one another;
calculating the frequency of the identified word pairs; and
adding the identified word pairs and corresponding frequency information to the language model;
receiving an original query for documents;
tokenizing the original query into a tokenized query;
extracting a group of associated terms from the language model,
wherein the associated terms have a highest probability of relatedness to each of the terms in the tokenized query; and
wherein the probability of relatedness is calculated from the probabilities in the language model;
forming an expanded query comprising a top group of associated terms and the original query;
computing a boost weight for each term in the expanded query based on the probability of relatedness of the terms in the expanded query being related to the terms in the original query to create a weighted query;
submitting the weighted query to the search engine; and
receiving a list of documents from the plurality of documents that most closely correspond to the original query.

17. A storage medium having instructions stored thereon which when executed by a processor cause the processor to perform actions comprising:
providing a language model, the language model comprising a plurality of terms and a plurality of pair-values, each pair-value representing the relatedness of term pairs within a document;
receiving an original query for documents after the language model is prepared independent of the original query;
tokenizing the original query into a tokenized query;
extracting a group of associated terms from the language model,
wherein the extracting comprises identifying pair-values in the language model corresponding to term pairs comprising a term in the tokenized query and another term that is different from any term in the tokenized query and identifying associated terms as the terms that are different from any term in the tokenized query and that are related to at least one term in the tokenized query and
wherein the probability of relatedness is determined from the pair-values in the language model;
forming an expanded query comprising a top group of associated terms and the original query, wherein the top group of associated terms are a subset of the associated terms, the terms in the top group of associated terms having a higher probability of relatedness to terms in the tokenized query than associated terms not in the top group;
computing a boost weight for each term in the expanded query based on the probability of relatedness of the terms in the expanded query being related to the terms in the original query to create a weighted query; and
submitting the weighted query to a search engine.

18. The storage medium of claim 17 having further instructions stored thereon which when executed by a processor cause the processor to perform further actions comprising:
preparing the language model.

19. The storage medium of claim 17 wherein the preparing the language model comprises:
receiving a plurality of documents, for each of the plurality of documents;
tokenizing text included in the document;
identifying paragraph boundaries in the tokenized text;
identifying word pairs in the paragraphs, wherein the word pairs comprise two words occurring in any location in a particular paragraph, including adjacent to one another;
calculating the frequency of the word pairs in the paragraphs; and
adding the word pairs and corresponding frequency information to the language model.

20. The storage medium of claim 18 wherein the preparing the language model further comprises:
identifying the language used in the document.

21. The storage medium of claim 18 wherein the preparing the language model further comprises:
removing stopwords from the tokenized text.

22. The storage medium of claim 18 wherein the preparing the language model further comprises:
extracting text from the document before the tokenizing of the text from the document.

23. The storage medium of claim 18 wherein the preparing of the language model comprises:
computing the probability of alternate terms.

24. The storage medium of claim 18 wherein the preparing the language model comprises:
indexing the tokenized text.

25. The method of claim 17 wherein each pair-value represents the relatedness of term pairs within one or more same paragraphs of a document.

26. A computing device to retrieve documents in response to receiving a query for documents, the computing device comprising:
a processor, a memory coupled with the processor, and a storage medium having instructions stored thereon which when executed cause the computing device to perform actions including:
receiving a plurality of documents;
building a language model, the building comprising, for each of the documents,
tokenizing text included in the document;
defining paragraphs by identifying paragraph boundaries in the tokenized text;
identifying word pairs in each defined paragraph wherein the word pairs comprise two words occurring in any location in the same defined paragraph, including adjacent to one another;
calculating the frequency of the identified word pairs; and adding the identified word pairs and corresponding frequency information to the language model;
receiving a query for documents;
tokenizing the query for documents into a tokenized query;
extracting a group of associated terms from the language model,
 wherein the associated terms have a highest probability of relatedness to each of the terms in the tokenized query and
 wherein the probability of relatedness is calculated from the probabilities in the language model;

forming an expanded query comprising a top group of associated terms and the query for documents;
computing a boost weight for each term in the expanded query based on the probability of relatedness of the terms in the expanded query being related to the terms in the query for documents to create a weighted query;
submitting the weighted query to the search engine; and
receiving a list of documents from the plurality of documents that most closely correspond to the query for documents.

* * * * *